United States Patent
Gunasekara

(10) Patent No.: US 8,238,883 B1
(45) Date of Patent: Aug. 7, 2012

(54) SYSTEM AND METHOD FOR CONNECTING CALLS BETWEEN DIFFERENT COMMUNICATION TECHNOLOGIES

(75) Inventor: Don Gunasekara, Reston, VA (US)

(73) Assignee: Nextel Communications, Inc., Reston, VA (US)

( * ) Notice: Subject to any disclaimer, the term of this patent is extended or adjusted under 35 U.S.C. 154(b) by 889 days.

(21) Appl. No.: 11/589,784

(22) Filed: Oct. 31, 2006

(51) Int. Cl.
H04M 3/42 (2006.01)

(52) U.S. Cl. .................. 455/414.1; 455/414.4; 455/417; 455/518; 455/519

(58) Field of Classification Search ............... 455/569.2, 455/456.6, 518, 414.1, 519, 432.1, 432.2, 455/414.4; 701/213; 370/260, 412, 352; 704/201
See application file for complete search history.

(56) References Cited

U.S. PATENT DOCUMENTS

| | | | | |
|---|---|---|---|---|
| 5,678,207 A * | 10/1997 | Williams et al. | ........... | 455/569.2 |
| 6,404,775 B1 * | 6/2002 | Leslie et al. | ................... | 370/466 |
| 7,359,726 B2 * | 4/2008 | Choksi | .......................... | 455/519 |
| 7,415,282 B2 * | 8/2008 | Tillet et al. | ..................... | 455/509 |
| 2004/0023665 A1 * | 2/2004 | Simmonds et al. | ........ | 455/456.1 |
| 2004/0121781 A1 * | 6/2004 | Sammarco | ................. | 455/456.1 |
| 2004/0236856 A1 * | 11/2004 | Keohane et al. | ............. | 709/229 |
| 2005/0288039 A1 * | 12/2005 | Liou | .......................... | 455/456.6 |
| 2006/0002372 A1 | 1/2006 | Smith | | |
| 2006/0030344 A1 * | 2/2006 | Lim | .............................. | 455/512 |
| 2006/0094444 A1 | 5/2006 | Hansen | | |
| 2006/0095507 A1 * | 5/2006 | Watson | ......................... | 709/203 |
| 2006/0184525 A1 * | 8/2006 | Jones et al. | ....................... | 707/6 |
| 2006/0195261 A1 * | 8/2006 | Riley | ........................... | 701/213 |
| 2006/0223583 A1 * | 10/2006 | Cavgalar et al. | ............... | 455/560 |
| 2006/0229078 A1 * | 10/2006 | Itzkovitz et al. | .............. | 455/445 |
| 2007/0002779 A1 * | 1/2007 | Lee et al. | ....................... | 370/260 |
| 2007/0021132 A1 * | 1/2007 | Jin et al. | .......................... | 455/518 |
| 2007/0206620 A1 * | 9/2007 | Cortes et al. | ................... | 370/412 |
| 2007/0280203 A1 * | 12/2007 | Shaffer et al. | ................. | 370/352 |
| 2008/0261566 A1 * | 10/2008 | Descombes | ................ | 455/414.1 |
| 2008/0281585 A1 * | 11/2008 | Feher | ............................ | 704/201 |

OTHER PUBLICATIONS

Vanu, "The Vanu Anywave™ Base Station Subsystem", A Radio Access Network for 2G/3G and Future Wireless Standards, Apr. 2006.

OLES/Institute for Telecommunication Sciences, "Advanced Generation of Interoperability for Law Enforcement", A Program of the National Institute of Justice, Technology Evaluation Report, Technical Evaluation of the TRP-1000 and ACU-1000—Test Procedures and Results, Document No. TE-00/0002-01, Aug. 25, 2000.

(Continued)

Primary Examiner — Edward Urban
Assistant Examiner — Golam Sorowar

(57) ABSTRACT

Systems and methods for connecting calls of different communication technologies are provided. A communications network component includes a radio frequency unit and a baseband processing unit. The baseband processing unit operates as a software-defined radio baseband processing unit. The baseband processing unit can be programmed to support connections between two or more communication technologies, and can control the radio frequency unit to communicate over the appropriate frequency bands with originating and destination communication stations. The communication technology of the originating or destination communication stations is a high performance push-to-talk (HPPTT) or WiMAX-based technology, and the communication technology of the other communication station can be a land mobile radio, satellite, public switched telephone network, or iDEN communication technology.

16 Claims, 3 Drawing Sheets

OTHER PUBLICATIONS

Office for Domestic Preparedness, "Developing Multi-Agency Interoperability Communications Systems: User's Handbook", Applicable to: ACU-1000 Modular Interface/Interconnect System and TRP-1000 Transportable Radio Interconnect System.

SDR forum, "Software Defined Radio Technology for Public Safety", Working Document SDRF-06-W-xxxx.-01 (as approved by the Public Safety SIG), Version 0.1, Jan. 18, 2006.

Alok Shah, et al., A Prototype All-Software Public Safety Interoperability System.

SDR forum, "Software Defined Radio Technology for Public Safety", Working Document SDRF-06-W-0001-1.0 (as approved by the Public Safety (SIG), Version 1.0, Mar. 10, 2006.

Raytheon, JPS Communications, "ACU-1000™ Interoperability NOW™", Mar. 2004.

Raytheon, JSP Communications, ACU-1000 Modular Interface/Interconnect System, Application Notes, Jun. 2003.

* cited by examiner

SYSTEM AND METHOD FOR CONNECTING CALLS BETWEEN DIFFERENT COMMUNICATION TECHNOLOGIES

BACKGROUND OF THE INVENTION

There are currently a variety of technologies for conducting communications between fixed and/or mobile communication stations. Some communication technologies are not compatible with others, which can prevent two communication stations from communicating with each other. This incompatibility is particularly problematic for emergency workers and other first responders. Many fire departments and police agencies operate private land mobile radio (LMR) systems for intra-department communications. These private systems typically provide push-to-talk (PTT) communications over VHF and UHF frequency bands and do not interoperate with each other or with other communication systems. Unlike conventional circuit-switched or interconnect voice communication technologies, push-to-talk systems provide half-duplex communications, and are typically implemented in a proprietary manner. Accordingly, during an emergency situation a police agency may not be able to communicate with a fire department due to the use of different land mobile radio systems.

JPS Communications, Inc., provides a modular interface/interconnect system known as the ACU-1000. This system can interconnect communications between a land mobile radio system, public switched telephone network (PSTN), satellite communication system, cellular communication system and/or an iDEN push-to-talk and interconnect communication network. The ACU-1000 requires a hardware interface module for each communication technology that is to be supported for interconnection of communication stations. Each interface module includes hardware specifically designed for a particular communication technology. Accordingly, an interface module must be ordered from JPS Communications, Inc. and then installed in the ACU-1000 system to support a particular communication technology.

One problem with the ACU-1000 is that if a particular interface module is not already installed in the system, the system cannot support that communication technology. This is particularly problematic for supporting emergency personnel because it may not be known in advance which types of communication technologies will be employed by particular agencies and departments responding to an emergency. Accordingly, this system cannot quickly adapt to the unpredictable requirements of emergency situations. In order to avoid this problem an emergency agency must purchase every conceivable type of interface module, which can be an unnecessary expense when some of these modules are never actually needed. Another problem with the ACU-1000 is that each interface module includes its own radio interface circuitry (e.g., duplexers, filters, preamplifiers, analog-to-digital converters, digital-to-analog converters, upconverters and downconverters) and requires separate antennas.

Vanu, Inc. of Cambridge Mass., provides the Vanu Anywave™ Base Station Subsystem (BSS), which is a software defined radio subsystem. This subsystem can be reprogrammed to enable arbitrary combinations of wireless communication technologies, such as iDEN, GSM and 1xRTT.

SUMMARY OF THE INVENTION

Although the ACU-1000 and Vanu Anywave BSS support a number of wireless communication technologies, these products do not currently support all types of communication technologies, such as WiMAX and high performance push-to-talk (HPPTT) technologies. High performance push-to-talk technologies are push-to-talk communication technologies that operate over a code division multiple access (CDMA) air interface and largely employ proprietary signaling protocols. High performance push-to-talk can, however, employ some open standards-based protocols such as Session Initiation Protocol (SIP) for registration with an application server. Moreover, high performance push-to-talk can be implemented on an EV-DO Rev. A network (also referred to as DORA). In contrast, Push-to-Talk over Cellular (PoC), which also operates over a CDMA air interface, operates using open standards-based protocols, such as SIP.

Because high performance push-to-talk is based on proprietary protocols, the performance of this technology is much greater than that of Push-to-Talk over Cellular-based technologies. Specifically, call setup time, an important factor for push-to-talk communications, can be quite long for Push-to-Talk over Cellular-based technologies, whereas high performance push-to-talk provides call setup times that are the same, or very close to, those provided in iDEN and land mobile radio systems. This advantage of high performance push-to-talk should lead to greater adoption of this technology compared to Push-to-Talk over Cellular-based technologies for those who have used iDEN or land mobile radio push-to-talk communication technologies.

Accordingly, exemplary embodiments of the present invention provide a software defined radio communications network component that can interconnect calls between various communication technologies. These technologies include high performance push-to-talk, WiMAX, satellite, public switch telephone network, land mobile radio and the like.

In view of the above-identified and other deficiencies of conventional systems, the present invention provides systems and methods for connecting communication stations operating according to different communication technologies. In particular, the system includes a radio frequency unit and a software-defined radio baseband processing unit. The baseband processing unit can control conversion of communications between the different communication technologies, and can control the radio frequency unit based on the types of communication technologies being connected. The communication technology of an originating or destination communication stations is high performance push-to-talk (HPPTT) or WiMAX-based technology, and the communication technology of the other communication station can be a land mobile radio, satellite, public switched telephone network, or iDEN communication technology.

Accordingly, to support any particular communication technology generally requires programming of the baseband processing unit with additional program code for the particular communication technology. This additional program code can be provided in a number of different ways, including using other-the-air (OTA) programming.

Other objects, advantages and novel features of the present invention will become apparent from the following detailed description of the invention when considered in conjunction with the accompanying drawings.

BRIEF DESCRIPTION OF THE DRAWING FIGURES

DETAILED DESCRIPTION OF THE PREFERRED EMBODIMENTS

Figure 1:
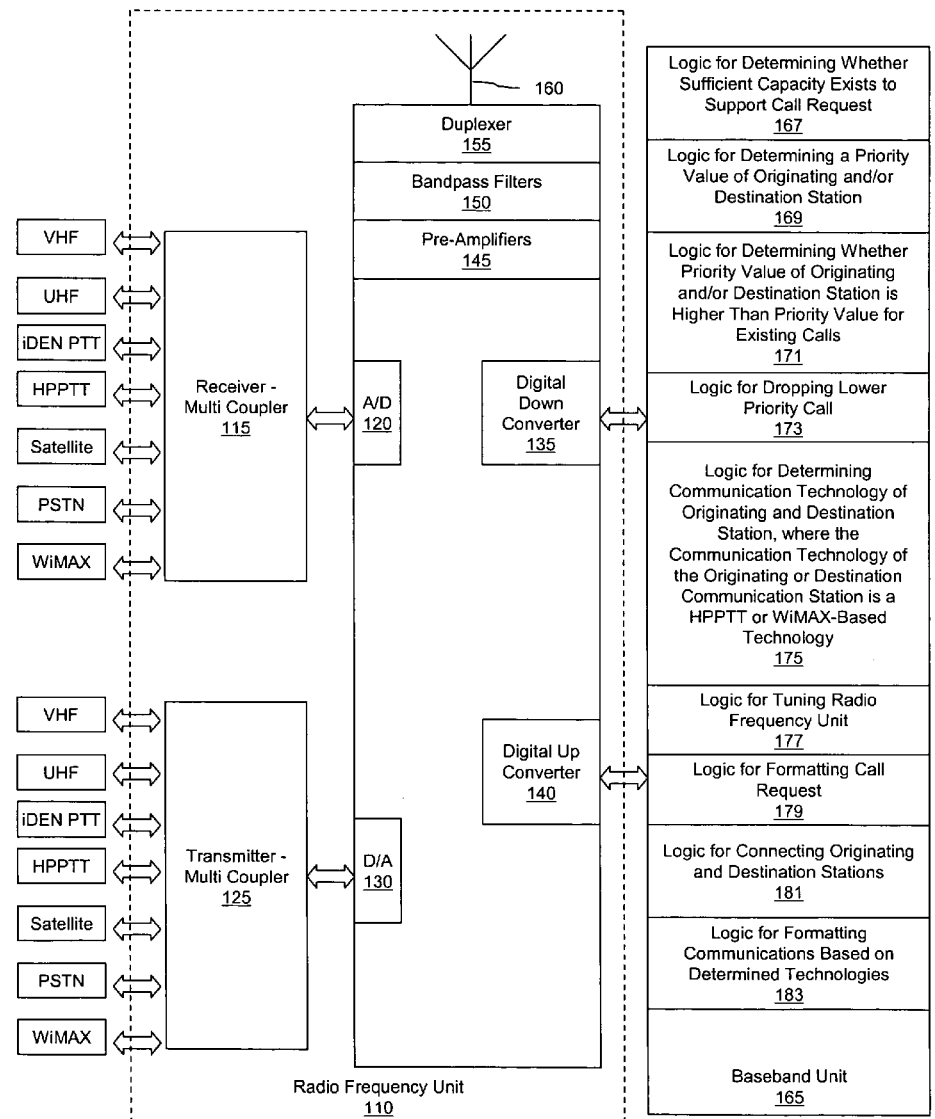
FIG. 1 is a block diagram illustrating an exemplary communications network component in accordance with the present invention.

FIG. 1 is a block diagram illustrating an exemplary communications network component in accordance with the present invention. The communication network component can be implemented as a fixed station, such as a base station, and/or as a portable station. The component includes a radio-frequency unit 110 and baseband unit 165. The radio frequency unit 110 includes receiver multi-coupler 115 coupled to analog-to-digital converter 120 and transmitter multi-coupler 125 coupled to digital-to-analog converter 130. Digital downconverter 135 and digital upconverter 140 couple baseband unit 165 with radio frequency unit 110. Radio frequency unit 110 also includes pre-amplifiers 145, bandpass filters 150, duplexer 155 and antenna 160. Analog-to-digital converter 120, digital-to-analog converter 130, digital downconverter 135 and digital upconverter 140 operate in a conventional manner.

Preamplifiers 145 include one or more preamplifiers to support a variety of communication technologies. Similarly, bandpass filters 155 include one or more bandpass filters to support a variety of communication technologies. Duplexer 155 can include one or more duplexers to support a variety of communication technologies, or can include a single duplexer that can be electrically or mechanically tuned to the frequency bands of particular communication technologies.

When designing the radio frequency unit 110 consideration should be given to the bandwidth and dynamic range requirements for various communication technologies, whether the linearity of the power amplifier(s) is sufficient, whether the switching speed is sufficient to support any number of different TDMA modes, and whether filtering and stability are sufficient to meet transmit (TX) spectrum requirements and receive (RX) adjacent channel rejection requirements.

Receiver multi-coupler 115 and transmitter multi-coupler 125 each can include one or more multiplexers for multiplexing signals received from or transmitted to one or more communication stations. Multi-couplers 115 and 125 can be coupled to appropriate wired facilities for communications involving wired communication technologies, and coupled to antenna 160 for communications involving one or more wireless communication technologies. Multi-couplers 115 and 125 can also be coupled via a wired connection to one or more wireless network infrastructures for supporting wireless communications. Antenna 160 can include one or more antennas or antenna arrays, any of all of which can be electrically and/or mechanically controlled adaptive antennas.

The communication technologies illustrated in FIG. 1 include land mobile radio system dispatch communications using VHF or UHF frequencies, iDEN dispatch and interconnect communications, high performance push-to-talk (HPPTT), interconnect and/or dispatch satellite communications, interconnect public switched telephone network communications and interconnect or push-to-talk communications using WiMAX. Although FIG. 1 illustrates particular communication technologies, the present invention can be employed to connect communication stations of any type of communication technology (e.g., data communications) in addition to those identified.

Baseband unit 165 operates as a software-defined radio and includes logic 167-183, which will be described in more detail below in connection with FIG. 2. Baseband unit 165 can, among other things, control modulation techniques, wide-band or narrow-band operation and security functions (e.g., frequency hopping). Baseband unit 165 can implement logic 167-183 using a combination of hardware (e.g., one or more processors) and software (e.g., loaded in the hardware from a memory). Although FIG. 2 illustrates logic 167-183 as separate components, one or more of these can be combined into a single logic unit.

Figure 2:
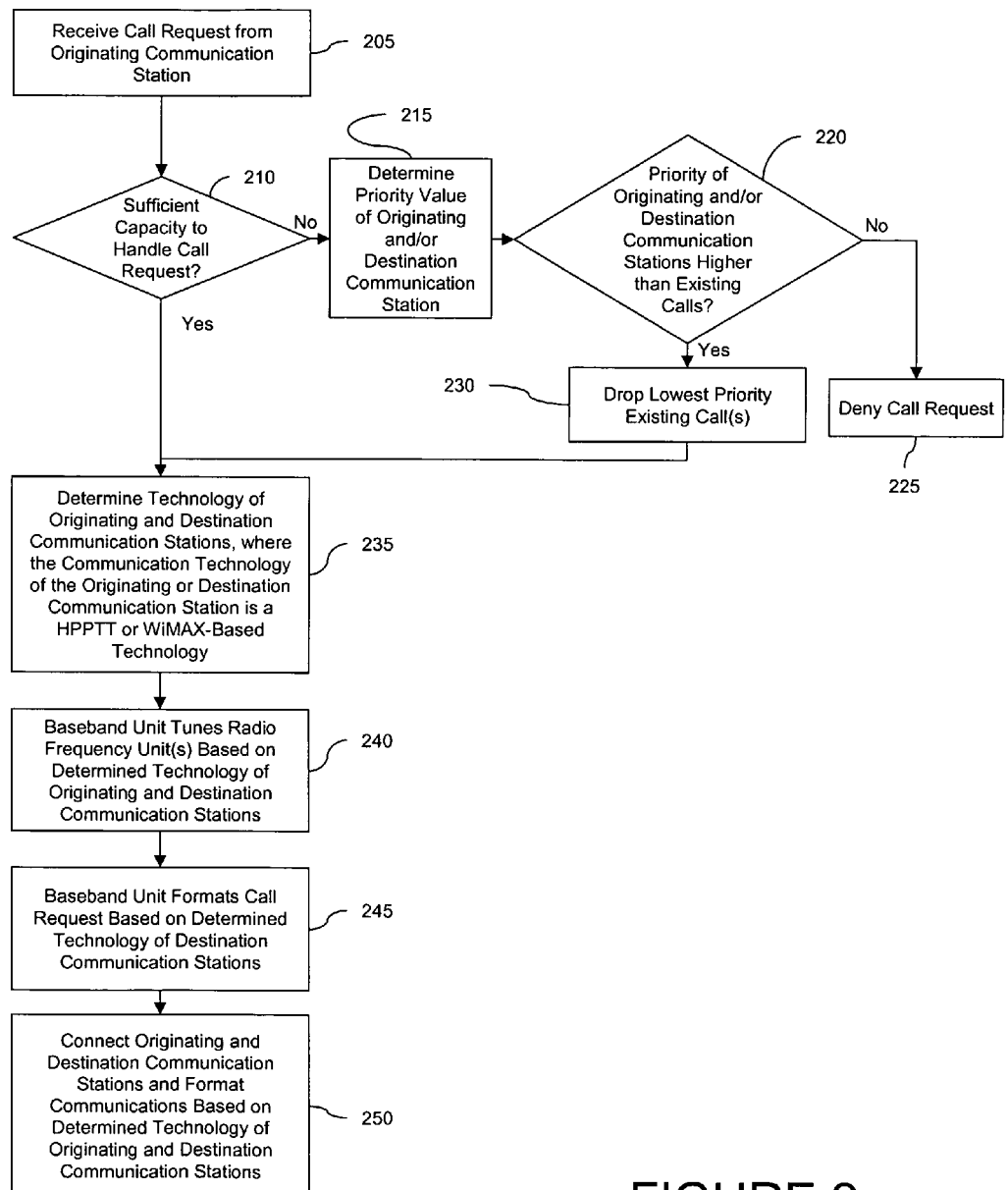
FIG. 2 is a flow diagram illustrating an exemplary method for connecting communication stations in accordance with the present invention.

FIG. 2 is a flow diagram illustrating an exemplary method for connecting communication stations in accordance with the present invention. When the communications network component receives a call request from an originating communications station (step 205), logic 167 determines whether the unit has sufficient capacity to handle the incoming call request (step 210). When there is not sufficient capacity to handle the call request ("No" path out of decision step 210), then logic 169 determines the priority value of the originating and/or destination communication stations (step 215). Logic 171 then determines whether the priority value of the originating and/or destination communication stations is higher than priority values for existing calls (step 220).

When the priority value of the originating and/or destination communication station is not higher than those of existing calls ("No" path out of decision step 220), then the call request is denied (step 225). When the priority value of the originating and/or destination communication station is higher than those of existing calls ("Yes" path out of decision step 220), then logic 173 drops the lowest priority existing call in order to handle the call request (step 230).

After dropping the lowest priority existing call (step 230) or if the communications network component has sufficient capacity to handle the call request ("Yes" path out of decision step 210), then logic 175 determines the communication technology of the originating and destination communication stations, where the communication technology of the originating or destination communication station is a high performance push-to-talk or WiMAX-based technology (step 235). Based on the determined technology, logic 177 tunes radio frequency unit 110 (step 240) and logic 179 formats the call request based on the determined communication technology (step 245). Logic 181 then connects the originating and destination communication stations and logic 183 formats the communications based on the determined technology (step 250).

Although not illustrated in FIG. 2, if a call request is received by the communication network component, there is not sufficient capacity to handle the request, and the incoming call request has a higher priority than the ongoing call between the originating and destination communication stations, then the call between the originating and destination communication stations will be dropped using, for example, logic 169-173. Additionally, baseband unit 165 can connect more than two communication stations to a call and/or conference together two or more calls.

Figure 3:
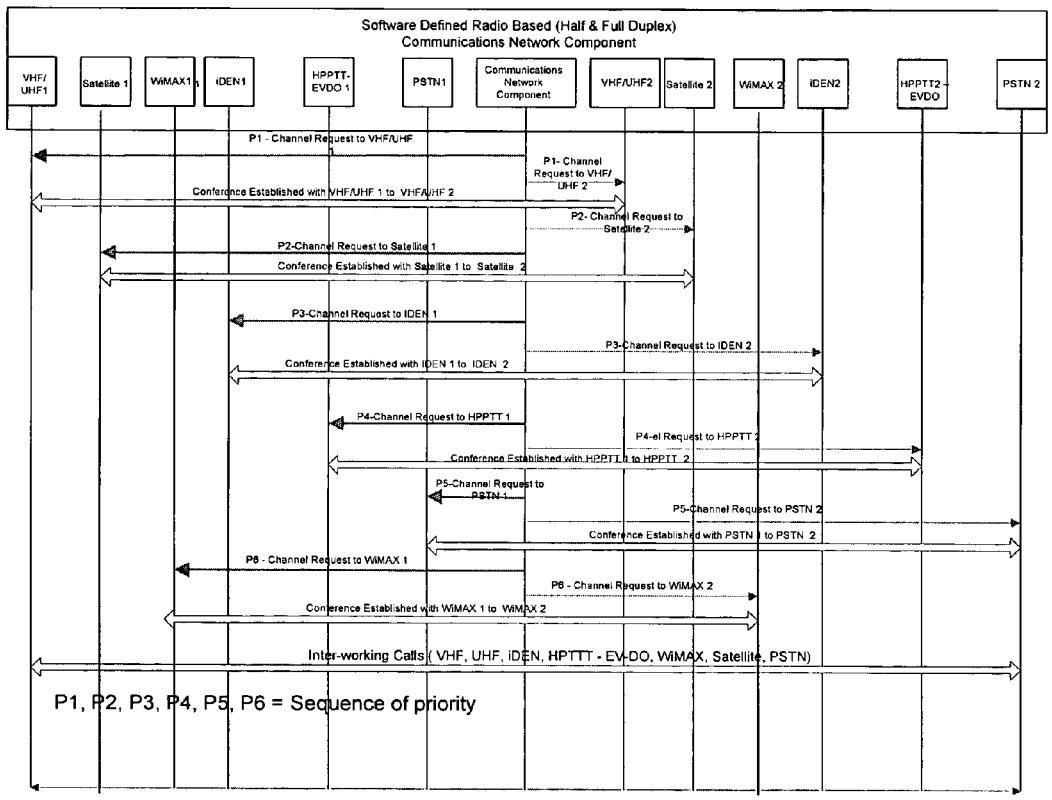
FIG. 3 is call flow diagram illustrating an exemplary call flow in accordance with exemplary embodiments of the present invention.

FIG. 3 is call flow diagram illustrating an exemplary call flow in accordance with exemplary embodiments of the present invention. The call flow of FIG. 3 illustrates the handling of various channel requests by the communications network component based on priority. Accordingly, when a number of call requests are received simultaneously or substantially simultaneously, then the calls are setup based on the priority value of the originating and/or destination communication station. Once the calls are setup, any or all of the calls can be inter-worked by the communications network component.

Specifically, based on the sequence of priority of P1, P2, P3, P4, P5 and P6 calls are established using channel requests first between two land mobile radio systems (VHF/UHF 1 and VHF/UHF 2), then between two satellite systems (Satellite 1 and Satellite 2), two iDEN systems (iDEN 1 and iDEN 2), two high performance push-to-talk systems (HPPTT 1 and HPPTT 2), between two public switched telephone networks (PSTN 1 and PSTN 2), and finally between two WiMAX networks (WiMAX 1 and WiMAX 2). Once all of the individual connections are established, they can all be joined into a single call, if desired. It should be recognized that the call flow of FIG. 3 is merely exemplary and that the calls can initially be connected between different communication technologies, they can be conferenced in a different order (e.g., P1 and P2 are conference together before connecting the P3 call, etc.), and the like.

Although exemplary embodiments have been described in connection with a software-defined radio in the communications network component, one or more communication stations that communicate using this component can also include software-defined radios. Software-defined radios can be multi-band radios that operate in a wide frequency range. These radios can be multi-mode, multi-band, and/or multi-functional wireless devices, and changes can be implemented using upgraded software. The characteristics of software-defined radios can be reconfigured to perform different functions (e.g., support different frequency bands) at different times.

Over-the-air software downloads can be employed to dynamically update characteristics of baseband unit 165 or a similar software defined unit in a communication station. This capability improves interoperability by allowing software reconfiguration to meet the requirements of communication during an emergency. In contrast, conventional communication stations require the costly and time-consuming operation of physically transporting each communication station to a radio shop for reprogramming.

Using software-defined radios in the communication stations and the communication network component, public safety agencies can upgrade from an existing system to a new system by allowing cross-programming channels which allows interoperability of communication stations as public safety agencies upgrade communication systems. When public safety agencies obtain new frequencies, software-defined communication stations and communication network components can be reprogrammed to support the new frequencies while still allowing older communication stations to operate on the older frequencies. This results in a great cost savings because these additional frequencies can be accommodated without having to replace the entire system.

Because some public safety communications systems utilize proprietary protocols, the communication network component can be programmed to include multiple proprietary waveforms from different vendor systems, which would provide even greater interoperability options than multi-band radios that support only non-proprietary protocols. Software-defined radios in communication stations allows these stations to roam across different wireless network that operate using different communication technologies in a manner that is transparent to the user of the communication station.

To support communication between communication stations operating according to different communication technologies, a single communication network component (e.g., a base station) can accept a radio transmission and rebroadcast it over multiple frequencies simultaneously. Each communication station can receive identical, real-time transmissions from the software-defined radio-equipped base station. Additionally, or alternatively, a number of base stations can be employed to rebroadcast the signal.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for interconnecting a plurality of calls from originating communication stations to destination communication stations, the method comprising:
   receiving at a communications network component a plurality of call requests from originating communication stations for destination communication stations;
   determining at the communications network component based on each of the received call requests a communication protocol of each of the originating and destination communication stations, wherein each of the plurality of call requests uses a different communication protocol;
   tuning a radio frequency unit of the communications network component to communicate directly with the originating and destination communication stations using the determined communication protocols;
   formatting at the communications network component the call request based on the determined communication protocol of each of the destination communication stations;
   connecting the originating and destination communication stations via one or more antennas of the communications network component; and
   joining the connected originating and destination stations into a single call.

2. The method of claim 1, further comprising the act of:
   formatting communications between the originating and destination communication stations based on the determined communication protocol.

3. The method of claim 1, wherein the communication protocol of one of the plurality of originating and destination communication is a push-to-talk communication protocol.

4. The method of claim 3, wherein the communication protocol of one of the plurality of originating communication stations and destination communication stations is a land mobile radio push-to-talk communication protocol or a HPPTT communication protocol.

5. The method of claim 1, wherein the communication protocol of one of the plurality of originating communication stations and destination communication stations is an interconnect communication protocol.

6. The method of claim 5, wherein the interconnect communication protocol is a wireless communication protocol.

7. The method of claim 1, further comprising the act of:
   determining that a call request is received with a higher priority value than the determined priority value of the originating and destination communication stations; and
   terminating the connection between the originating and destination communication stations.

8. The method of claim 1, wherein the communication protocol of one of the plurality of originating communication stations and destination communication stations is a satellite-based communication protocol or a WiMAX protocol.

9. A method for interconnecting a plurality of calls from originating communication stations to destination communication stations, the method comprising:
- receiving at a communications network component a plurality of call requests from originating communication stations for destination communication stations;
- determining at the communications network component based on each of the received call requests a communication protocol of the originating and destination communication stations, wherein each of the plurality of call requests uses a different communication protocol;
- tuning a radio frequency unit of the communications network component to communicate directly with the originating and destination communication stations using the determined communication protocols;
- formatting at the communications network component the call request based on the determined communication protocol of each of the destination communication stations;
- determining that there is not sufficient capacity to handle at least one of the call requests;
- determining a priority value of the originating or destination communication stations;
- comparing the determined priority value with priority values for existing calls;
- dropping a lower priority call when the determined priority is greater than the priority values for existing calls;
- connecting the originating and destination communication stations via one or more antennas of the communications network component; and
- joining the connected originating and destination stations into a single call.

10. A communications network component, the component comprising:
- a radio frequency unit; and
- a software-defined baseband processing unit, wherein the baseband processing unit comprises
  - logic for receiving a plurality of call requests from originating communication stations for destination communication stations;
  - logic for determining based on each of the received call requests a communication protocol of each of the originating and destination communication stations, wherein each of the plurality of call requests uses a different communication protocol;
  - logic for tuning the radio frequency unit to communicate directly with the originating and destination communication stations based on the determined communication protocols;
  - logic for formatting the call request based on the determined communication protocol of each of the destination communication stations;
  - logic for connecting the originating and destination communication stations; and
  - logic for formatting communications between the originating and destination communication stations based on the determined communication protocol; and
- joining the connected originating and destination stations into a single call.

11. The component of claim 10, wherein the baseband processing unit further comprises:
- logic for determining that there is not sufficient capacity to handle one of the call requests;
- logic for determining a priority value of the originating or destination communication stations;
- logic for comparing the determined priority value with priority values for existing calls; and
- logic for dropping a lower priority call when the determined priority is greater than the priority values for existing calls.

12. The component of claim 10, wherein the communication protocols of the originating and destination communication stations are push-to-talk communication protocols.

13. The component of claim 12, wherein the communication protocol of one of the plurality of originating communication stations and destination communication stations is an interconnect communication protocol.

14. The component of claim 10, wherein the communication protocol of one of the plurality of originating communication stations and destination communication stations is a push-to-talk communication protocol or an interconnect communication protocol.

15. The component of claim 14, wherein the interconnect communication protocol is a wireless communication protocol.

16. The component of claim 10, wherein the communication protocol of one of the plurality of originating communication stations and destination communication stations is a satellite-based communication protocol or a WiMAX protocol.

* * * * *